United States Patent [19]
Widmayer et al.

[11] Patent Number: 6,069,797
[45] Date of Patent: May 30, 2000

[54] POWER DISTRIBUTION ASSEMBLY

[75] Inventors: Robert B. Widmayer, Harvard; Stephen P. Flood, Lake Zurich; Joseph P. Luptak, III, Elgin, all of Ill.

[73] Assignee: Motorola, Inc., Schaumburg, Ill.

[21] Appl. No.: 09/222,605

[22] Filed: Dec. 29, 1998

[51] Int. Cl.⁷ ...................................................... H05K 7/02
[52] U.S. Cl. ..................... 361/760; 361/788; 361/601; 230/66; 230/295; 174/52.1; 174/524; 455/3.1; 455/3.3
[58] Field of Search ..................................... 361/760, 788, 361/601, 688, 697, 722; 330/66, 295; 174/52.1, 52.4; 455/3.1, 3.3, 4.1, 6.1

[56] References Cited

U.S. PATENT DOCUMENTS

| | | | |
|---|---|---|---|
| 3,717,813 | 2/1973 | Lieverman et al. | 455/4.1 |
| 4,015,070 | 3/1977 | Theurer | 174/52.1 |
| 4,370,516 | 1/1983 | Bailey, Jr. et al. | 174/59 |
| 5,058,198 | 10/1991 | Rocci et al. | 455/6 |
| 5,304,943 | 4/1994 | Koontz | 330/51 |
| 5,581,801 | 12/1996 | Spriester et al. | 455/3.3 |
| 5,901,340 | 5/1999 | Flickinger et al. | 455/3.1 |
| 5,950,111 | 9/1999 | Georger et al. | 455/3.1 |

*Primary Examiner*—Leo P. Picard
*Assistant Examiner*—David Foster
*Attorney, Agent, or Firm*—Steven A. May

[57] ABSTRACT

A power distribution assembly (100) that comprises at least two direct current power supplies (106, 107), at least three signal splitter modules (102–104), wherein each signal splitter modules comprises a signal splitter and a radio frequency amplifier, a centerplane board (110) coupled to the at least three signal splitter modules (102–104) and to the at least two direct current power supply modules(106, 107), wherein the centerplane board (110) provides a plurality of electrical paths among a plurality of modules contained in the power distribution assembly (100), and a chassis (101) to which the modules (102–104, 106, 107) and the centerplane board (110) are mounted, and has an overall volume of at most 0.009 cubic meters.

19 Claims, 5 Drawing Sheets

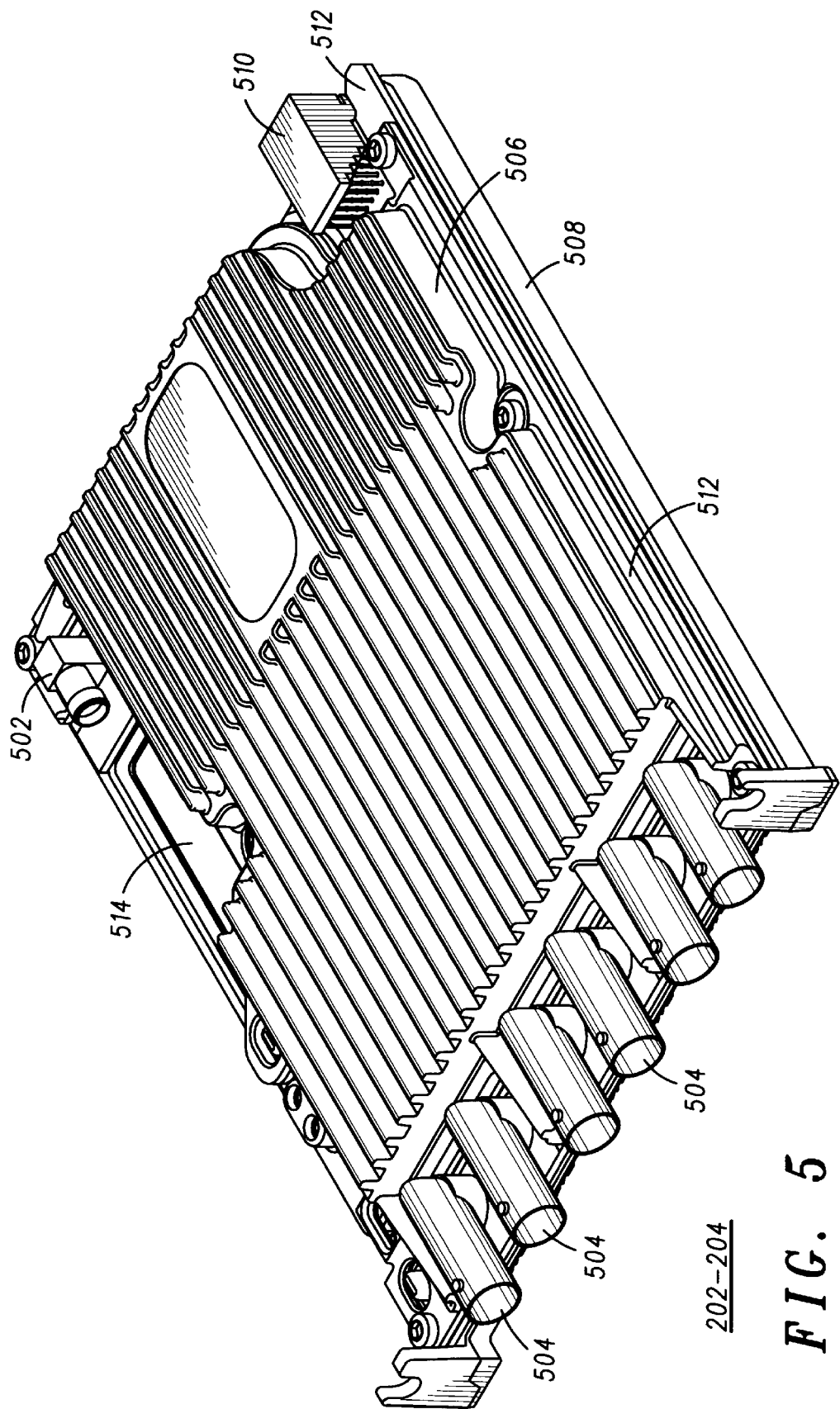

POWER DISTRIBUTION ASSEMBLY

FIELD OF THE INVENTION

This invention relates generally to radio frequency power distribution assemblies.

BACKGROUND OF THE INVENTION

Radio frequency (RF) power distribution assemblies are known to include one or more signal splitters, one or more RF amplifiers, one or more power supplies, and a chassis. The signal splitters, RF amplifiers, and power supplies are attached to the chassis via screws, or other equivalent fasteners.

In general, an RF power distribution assembly operates as follows. When a low level input signal is provided to an input of the power distribution assembly, the input signal is amplified by an RF amplifier and routed to a signal splitter. The signal splitter divides the input signal into multiple equal amplitude signals. Each of the multiple equal amplitude signals is routed to an output of the power distribution assembly or to another signal splitter for further division into multiple equal amplitude signals and for subsequent distribution via the power distribution assembly's outputs. Since the input signal is divided and sub-divided, it must be amplified by the power distribution assembly in order to maintain a desired level of signal strength. The power for the amplification of the input signal is provided by the direct current (DC) power supplies.

The power distribution assembly is traditionally a large, bulky, cumbersome assemblage of equipment. A power distribution assembly of a volume of approximately 0.009 cubic meters can comprise, at most, two low power (10 watt) single output power supplies, two RF amplifiers, two six-way (i.e., one input port and six output ports) signal splitters, and a chassis. The power supplies, RF amplifiers, and signal splitters are generally separate, self-contained and individually enclosed housings that are individually fastened onto the chassis. Bundled wiring is typically used to couple the power supplies to the RF amplifiers and to other peripheral equipment, and coaxial cables are typically used to couple external duplexers to the RF amplifiers, to couple the RF amplifiers to inputs of the signal splitters, and to couple outputs of the signal splitters to inputs of other signal splitters or to external devices. The prior art, with a voluminous design, lengthy and numerous cabling, and multiple, self-contained modules that are coupled together by cables, is not compatible with the current market's desire for smaller, more compact, and less expensive assemblies that can provide for the operation of an ever increasing number of RF communication channels via an ever smaller physical volume of equipment.

Furthermore, replacing a malfunctioning power supply, RF amplifier, or signal splitter in a power distribution assembly generally means shutting down all base stations served by the power distribution assembly. This means unnecessary down time for portions of a system that were operating problem-free and also means reduced system availability.

Therefore, a need exists for a power distribution assembly that is capable of more power distribution in a reduced volume as compared to prior art assemblies, that is compatible with modular designs and allows for modules to be swapped in and out without the need to shut down an entire system, and that eliminates the extensive and costly cabling of prior art.

BRIEF DESCRIPTION OF THE DRAWINGS

FIG. 5 illustrates a signal splitter module for use in a power distribution assembly in accordance with a preferred embodiment of the present invention.

DESCRIPTION OF A PREFERRED EMBODIMENT

Figure 1:
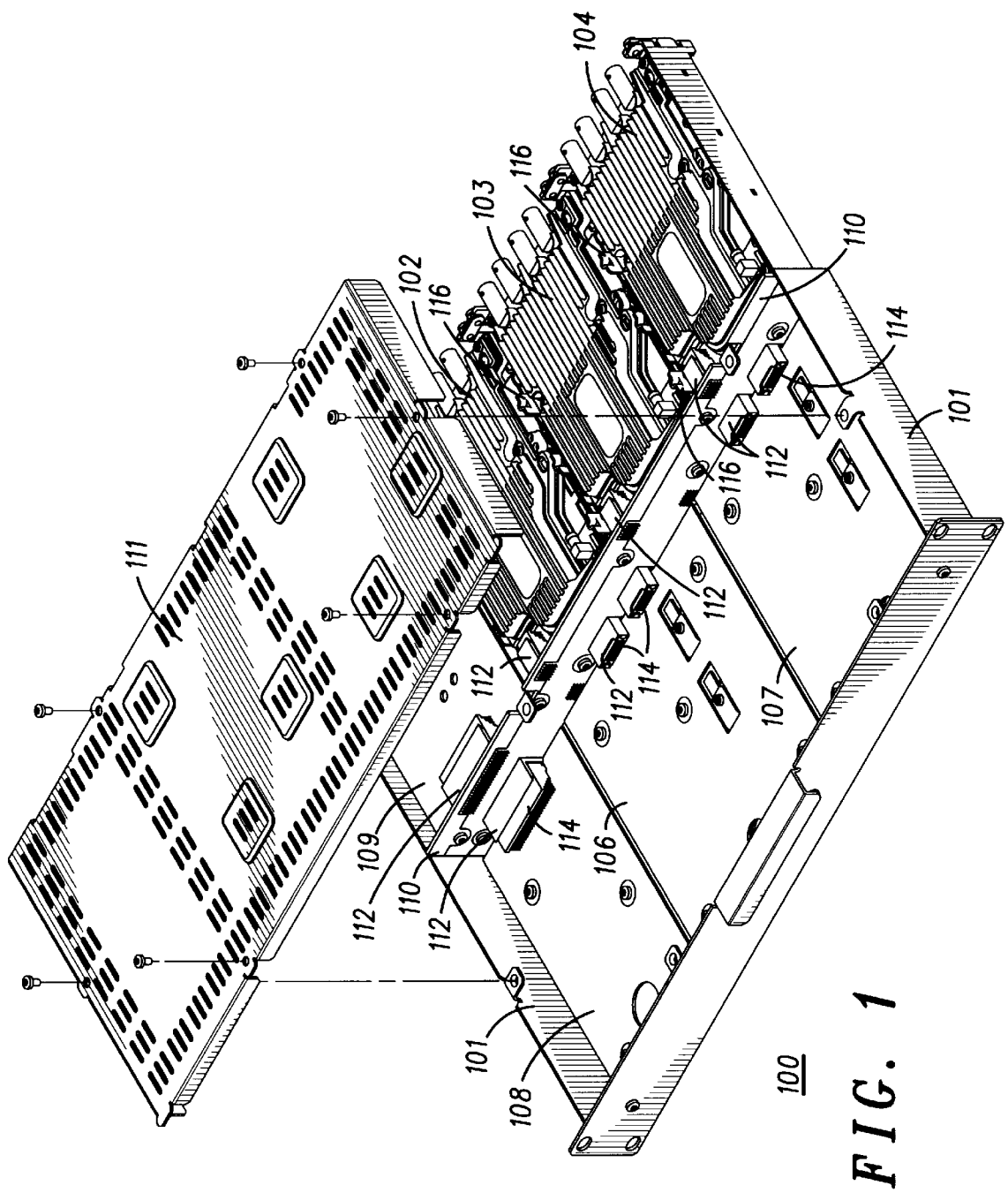
FIG. 1 illustrates a top view of a power distribution assembly in accordance with a preferred embodiment of the present invention.

To address the need for a power distribution assembly that is capable of more power distribution in a reduced volume as compared to prior art assemblies, that is compatible with modular designs and allows for modules to be swapped in and out without the need to shut down an entire system, and that eliminates the extensive and costly cabling of prior art, the present invention encompasses a power distribution assembly that comprises at least two direct current power supplies, at least three signal splitter modules, wherein each signal splitter module comprises a signal splitter and a radio frequency amplifier, a centerplane board providing electrical paths between each of the power supplies and each of the signal splitters without the use of cabling, and a chassis to which all of the equipment is mounted, and has an overall volume of at most 0.009 cubic meters.

Generally, the present invention encompasses a power distribution assembly comprising at least three signal splitter modules, wherein each of the at least three signal splitter modules comprises at least one input port and multiple output ports, at least two direct current power supply modules, a centerplane board coupled to the at least three signal splitter modules and the at least two direct current power supply modules, wherein the centerplane board provides multiple electrical paths among the modules contained in the power distribution assembly, a chassis that comprises mounting patterns for the at least three signal splitter modules, the at least two direct current power supply modules, and the centerplane board, and wherein the at least three signal splitters modules, the at least two direct current power supply modules, and the centerplane board are all mounted in the chassis and, along with the chassis, are all contained within an overall volume of at most 0.009 cubic meters.

Another embodiment of the present invention encompasses a power distribution assembly comprising at least two signal splitter modules, wherein each of the at least two signal splitter modules comprises at least one input port and multiple output ports, at least two direct current power supply modules, an interconnect module providing multiple electrical paths between one or more circuits within the power distribution assembly and devices external to the power distribution assembly, a centerplane board coupled to the at least two signal splitter modules, the at least two direct current power supply modules, and the interconnect module, wherein the centerplane board provides multiple electrical paths among the modules contained in the power distribution assembly, a chassis that comprises mounting patterns for the at least two signal splitter modules, the at least two direct current power supply modules, the interconnect module, and the centerplane board, and wherein the at least two signal splitters modules, the at least two direct current power supply modules, the interconnect module, and the centerplane board are all mounted in the chassis and, along with the chassis, are all contained within an overall volume of at most 0.009 cubic meters.

Finally, a third embodiment of the present invention encompasses a power distribution assembly comprising at least three power amplifier modules, wherein each of the at least three power amplifier modules comprises a direct current distribution circuit, a signal splitter circuit, and at least one power element, at least two direct current power supplies, a printed circuit board coupled to the at least three power amplifier modules and the least two direct current power supplies, wherein the printed circuit board provides multiple electrical paths among the modules contained in the power distribution assembly, a chassis that comprises mounting patterns for the at least three power amplifier modules, the at least two direct current power supplies, and the printed circuit board, and wherein the at least three power amplifier modules, the at least two direct current power supplies, and the printed circuit board are all mounted to the chassis and, along with the chassis, are all contained within an overall volume of at most 0.009 cubic meters.

Figure 2:
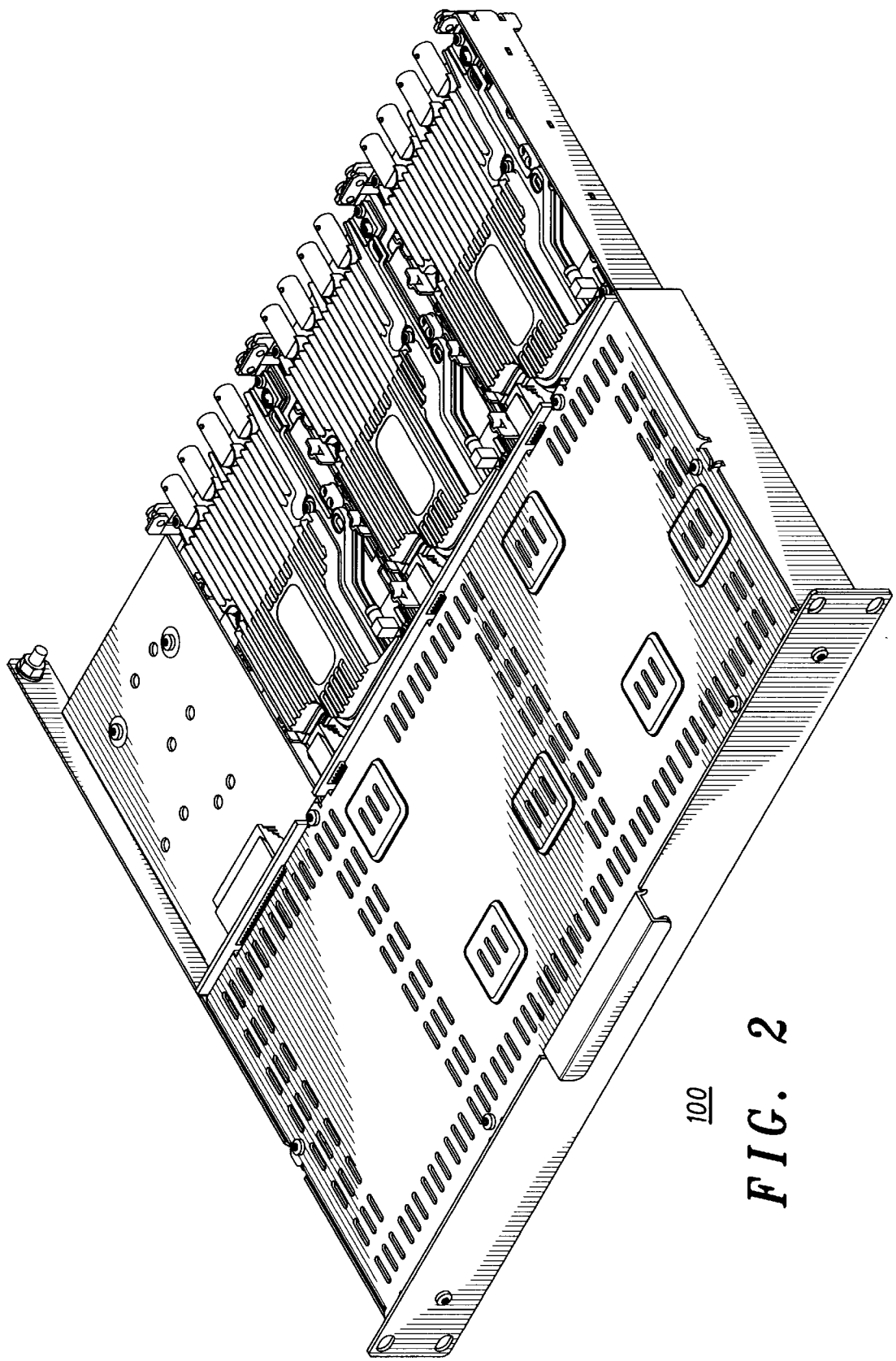
FIG. 2 illustrates a top view of a power distribution assembly in accordance with a preferred embodiment of the present invention.

Turning now to the drawings, wherein like numerals designate like components, FIGS. 1 and 2 each illustrate a top view of a power distribution assembly 100 in accordance with a preferred embodiment of the present invention. As shown in FIG. 1, the preferred embodiment of the power distribution assembly 100 comprises at least three signal splitters modules 102–104, two DC power supply modules 106, 107 that each comprise a high power (80 watt) multi-functional DC power supply, a power distribution assembly diagnostic module 108, an interconnect module 109, a centerplane board 10, a cover 111 for the two DC power supply modules 106, 107 and the power distribution assembly diagnostic module 108, and a chassis 101 comprising mounting patterns for each module contained in the power distribution assembly 100. In the preferred embodiment, the at least three signal splitters modules 102–104, the two DC power supply modules 106, 107, the power distribution assembly diagnostic module 108, and the interconnect module 109 are all coupled to the centerplane board 10 and, along with the centerplane board 110, are all mounted in the chassis 101. FIG. 2 is an illustration identical to FIG. 1 except that in FIG. 2 the cover 111 is mounted onto the chassis 101.

Figure 3:
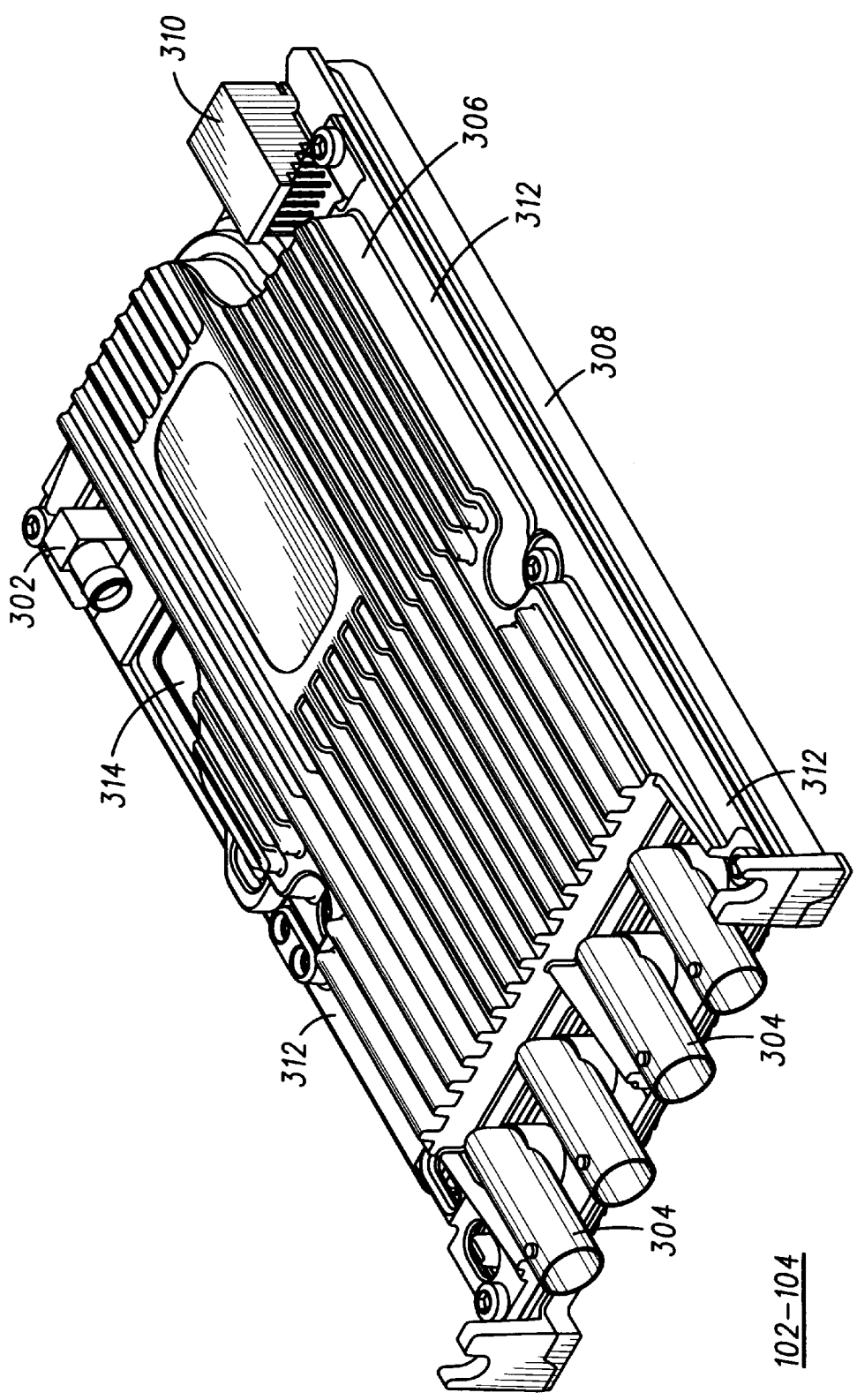
FIG. 3 illustrates a signal splitter module for use in a power distribution assembly in accordance with a preferred embodiment of the present invention.

FIG. 3 is an illustration of a signal splitter module 102–104 in accordance with a preferred embodiment of the present invention. Each signal splitter module 102–104 preferably comprises a radio frequency (RF) input connector 302, at least one power element that preferably comprises at least one amplifier circuit deposited on a printed circuit board, a signal splitter, multiple RF output connectors 304, a heat sink base 306, a cover 308, and a connector 310 that provides a blindmate interface for the centerplane board 110. The amplifier circuit preferably comprises an RF amplifying element such as a power transistor, input and output matching circuitry, and any biasing and decoupling circuitry necessary to allow functionality of the RF amplifying element.

In the preferred embodiment, the interconnect module 109 and centerplane board 110 each comprise at least one printed circuit board and connectors. Preferably, the interconnect module 109 further comprises connectors providing at least 64 interconnections, and alternatively, might also comprise a cover. The interconnect module 109 and centerplane board 110 provide a transfer medium between the DC power supply modules 106, 107 and internal circuits such as the signal splitter modules 102–104 and external devices such as fans, tower top amplifiers, and external diagnostic circuitry. The centerplane board 110 comprises connectors 112 that provide a blindmate interface for all of the modules in the power distribution assembly 100, so that the modules can be easily plugged into, or unplugged from, the power distribution assembly 100 and then fastened to the chassis 101 by screws or equivalent fasteners. The centerplane board 110 provides multiple electrical paths among the modules, and the circuits contained in the modules, in the power distribution assembly 100 and eliminates the need for the intermodule cabling that existed in the prior art. The interconnect module 109 and centerplane board 110 are normally mounted to the chassis 101 with screws, but may alternatively be attached via equivalent fasteners such as snaps.

The signal splitter modules 102–104 each amplify an RF signal input at an RF input connector 302 and then utilize power splitting techniques to divide the amplified RF signal into multiple equal power signals which are output at the multiple RF output connectors 304. In the preferred embodiment, the top side of the power distribution assembly 100 comprises a first, second, and third signal splitter module 102–104, each signal splitter module 102–104 comprising a four-way signal splitter (i.e., one input and four outputs) that splits an RF signal into four equal power signals. Preferably, the first, second, and third signal splitter modules 102–104 are co-planar in their positions in the power distribution assembly 100, and the 12 output connectors 304 of the signal splitter modules 102–104 are also co-planar.

In the preferred embodiment, there are two DC power supply modules 106, 107 and a power distribution assembly diagnostic module 108, all under a single cover 111. Each of these modules 106, 107, 108 comprises at least one connector 114 that provides a blindmate interface with the centerplane board 110, allowing for easy replacement since each module need only be plugged into and unplugged from the centerplane board 110 in order to fully connect it with the other components of the power distribution assembly 100. Preferably, the two DC power supplies 106, 107 each convert an input supply voltage of 48 VDC (volts direct current) to output supply voltages of 24 VDC and 12 VDC. The DC power supplies 106, 107 supply power for the operation of the power distribution assembly diagnostic circuitry 108, RF amplifiers in the signal splitters 102–104, and external devices such as fans and tower top amplifiers. The two DC power supplies 106, 107 are redundant, that is each power supply provides all of the functionality and is capable of providing all of the same services as the other power supply. The redundancy allows each power supply 106, 107 to be replaced without bringing down the system, since each power supply can supply all of the power and functionality required of the pair of power supplies while the other power supply is being replaced.

The power distribution assembly diagnostic module 108 comprises power distribution assembly diagnostic circuitry that monitors the proper operation of all active devices in the power distribution assembly 100 (e.g., a power transistor in each signal splitter 102–104) and that monitors alarm conditions of devices external to the power distribution assembly 100, such as tower top amplifiers and expansion rack circuit breakers. The power distribution assembly diagnostic module 108 further comprises at least one connector for coupling to the centerplane board 10. The two DC power supplies modules 106, 107, power distribution assembly diagnostic module 108, and the cover 111 of modules 106–108 are all mounted to the chassis 101 with screws, but may alternatively be attached via other equivalent types of fasteners.

Figure 4:
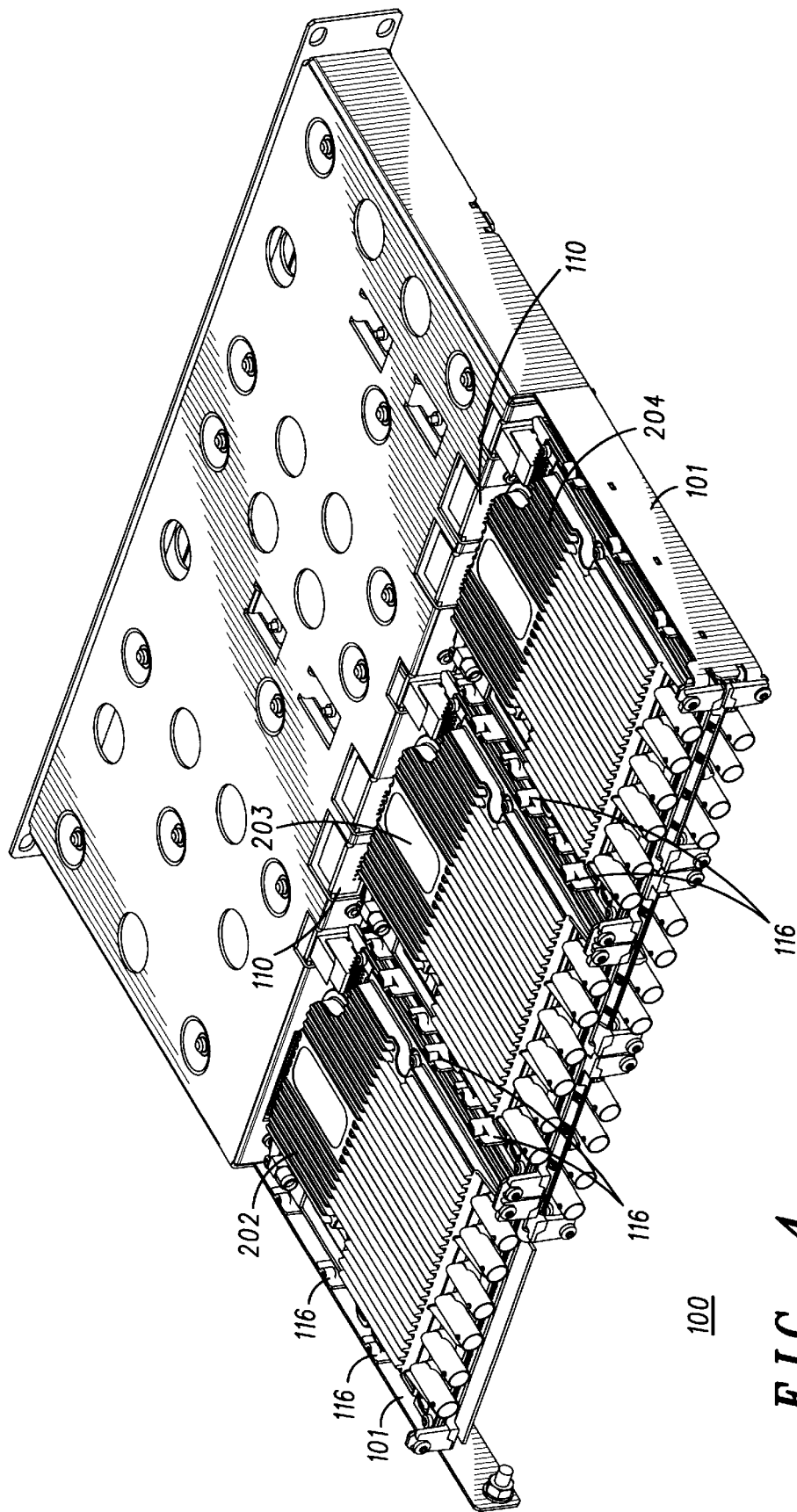
FIG. 4 illustrates a bottom view of a power distribution assembly in accordance with a preferred embodiment of the present invention.

FIG. 4 illustrates a bottom view of a power distribution assembly 100 in accordance with a preferred embodiment of the present invention. As shown in FIG. 4, the preferred embodiment of the power distribution assembly 100 comprises a chassis 101 and a centerplane board 110, as was shown in FIGS. 1 and 2, and further comprises a fourth, a fifth, and a sixth signal splitter module 202–204, wherein the fourth, fifth, and sixth signal splitter modules 202–204 are coupled to the centerplane board 110 and mounted to the chassis 101.

FIG. 5 is an illustration of a signal splitter module 202–204 in accordance with a preferred embodiment of the present invention. Each signal splitter module 202–204 comprises an RF input connector 502, a power element that preferably comprises at least one amplifier circuit deposited on a printed circuit board, a signal splitter, multiple RF output connectors 504, a heat sink base 506, a cover 508, and a connector 510 that provides a blindmate interface for the centerplane board 110. The amplifier circuit preferably comprises an RF amplifying element such as a power transistor, input and output matching circuitry, and any biasing and decoupling circuitry necessary to allow functionality of the RF amplifying element. Each amplifier circuit is supplied DC power by the DC power supplies 106, 107.

The signal splitter modules 202–204 each amplify an RF signal input at an input connector 502 and then utilize power splitting techniques to divide the amplified RF signal into multiple equal power signals which are output at the multiple output connectors 504. In the preferred embodiment, each of the fourth, fifth, and sixth signal splitter modules 202–204 comprises a six-way signal splitter (i.e., one input and six outputs) that splits an RF signal into six equal power signals. Preferably, the fourth, fifth, and sixth signal splitter modules 202–204 are co-planar in their positions in the power distribution assembly 100, which plane is parallel to and different from the plane containing the first, second, and third signal splitter modules 102–104. Additionally, in the preferred embodiment, the 18 output connectors 504 of the fourth, fifth, and sixth signal splitter modules 202–204 are co-planar.

In the preferred embodiment of the present invention, the signal splitter modules 102–104, 202–204 each provide a blindmate interface to the centerplane board 110 and are mounted to the chassis 101 by plugging their connectors 310, 510 into the connectors 112 of the centerplane board 110 and then securing the modules 102–104, 202–204 with screws. To assist in the mounting of the signal splitter modules 102–104, 202–204, the chassis 101 comprises guides 116 to guide the insertion of the signal splitter modules 102–104, 202–204 into the power distribution assembly 100, and each signal splitter module 102–104, 202–204 comprises guides 312, 512 that align with the guides 116 of the chassis 101. In addition, each signal splitter module 102–104, 202–204 comprises a cutout area 314, 514 to facilitate the coupling of a cable connector to the module's input connector 302, 502.

In an alternate embodiment of the power distribution assembly 100, the only signal splitters included in the power distribution assembly 100 are the fourth, fifth, and sixth signal splitter modules 202–204.

In a second alternate embodiment of the power distribution assembly 100, the two DC power supplies 106, 107 and the power distribution assembly diagnostic circuitry 108 are all contained in a single module. This module is coupled to the centerplane board 110 via a blindmate interface with the centerplane board 110 and is mounted into the chassis 101 by screws or equivalent fasteners.

In a third alternate embodiment of the power distribution assembly 100, the power distribution assembly 100 comprises a chassis 101, at least three power amplifier modules 102–104, two DC power supply modules 106, 107, a power distribution assembly diagnostic module 108, an interconnect module 109, and a centerplane board 110 that is coupled to the at least three power amplifier modules 102–104, the two DC power supply modules 106, 107, the power distribution assembly diagnostic module 108, and the interconnect module 109. Each power amplifier module comprises an RF input connector 302, at least one power element that preferably comprises at least one amplifier circuit deposited on a printed circuit board, a signal splitter, multiple RF output connectors 304, a heat sink base 306, a cover 308, and a connector 310. The amplifier circuit preferably comprises an RF amplifying element such as a power transistor, input and output matching circuitry, and any DC distribution circuitry and decoupling circuitry necessary to allow functionality of the RF amplifying element. The power amplifier modules 102–104, the two DC power supply modules 106, 107, the power distribution assembly diagnostic module 108, the interconnect module 109, and the centerplane board are mounted in the chassis 101, wherein the chassis 101 comprises mounting patterns for the at least three power amplifier modules 102–104, the two DC power supply modules 106, 107, the power distribution assembly diagnostic module 108, the interconnect module 109, and the centerplane board 110.

To better illustrate the principles of the present invention, the following is an example of the general operation of a power distribution assembly 100. The RF input connector 302 of a four-way signal splitter module 102–104 (e.g., signal splitter module 102) of a first power distribution assembly is coupled by coaxial cable to an external duplexer. Alternatively, the RF input connector 302 might be coupled to an antenna. One output connector 304 of signal splitter 102 is coupled by coaxial cable to an RF input connector 502 of a six-way signal splitter module 202–204 (e.g., signal splitter module 202) of the first power distribution assembly 100. The other three output connectors 304 of signal splitter module 102 are each coupled by coaxial cable to a respective RF input connector 502 of one of three six-way signal splitter modules 202–204 residing in a second power distribution assembly 100 or, alternatively, residing in each of a second, third, and fourth power distribution assembly 100.

The RF input connector 302 of signal splitter module 102 receives a low level RF input signal. The signal splitter module 102 amplifies the RF input signal to compensate for splitting losses, and splits the amplified RF input signal into four equal amplitude signals. One of the four equal amplitude signals is provided to an RF input connector 502 of a six-way signal splitter module 202–204 (e.g., signal splitter 202) of the same power distribution assembly 100, and three of the four equal amplitude signals are each provided to a respective RF input connector 502 of one of the three six-way signal splitter modules 202–204 of the second power distribution assembly 100. Again, each six-way signal splitter module amplifies the signal provided to the six-way splitter module to compensate for splitting losses and splits the amplified signal into six equal amplitude signals. The six equal amplitude signals are each output at an output connector 504. Thus, by configuring four power distribution assemblies 100 together, each of three RF input signals can be split into 24 equal amplitude output signals and can be compensated for all associated splitting losses. As briefly mentioned above, DC power utilized by signal splitter modules 102 and 202 during operation of the first power distribution assembly 100 is supplied by one of the two DC power supply modules 106, 107 via the centerplane module 110.

When amplifying the RF input signals, the RF amplifier circuits in each signal splitter module 102–104, 202–204 dissipates approximately 3 watts of DC power in the form of heat. This heat is transferred to the heat sink bases 306, 506 onto which each signal splitter module 102–104, 202–204 is mounted. The heat sink bases 306, 506 and the covers 308, 508 of the signal splitter modules 102–104, 202–204 preferably comprise a zinc alloy, but may be fabricated from any high thermal conductivity metal. In the preferred embodiment, each heat sink base 306, 506 includes fins that are approximately 1 millimeter thick and 3 millimeters tall and are equally spaced at approximately 5 millimeter intervals across the heat sink base 306, 506. The above implementation of the heat sink bases 306, 506 enables the 3 watts to be dissipated in a volume of less than 0.0003 cubic meters at room temperature. The heat sink base 306, 506 and cover 308, 508 of each signal splitter module 102–104, 202–204 fully encloses the signal splitter module and electromagnetically shields the signal splitter module from other circuit and power elements in the power distribution assembly 100.

In the preferred embodiment, the cover 111 of the DC power supply modules 106, 107 and the power distribution assembly module 108 and, alternatively, the cover of the interconnect module 109, comprise cold rolled steel and may include gasketing to provide electromagnetic shielding. Preferably, the covers also include air vents to facilitate air flow through the modules and to help maintain a desirable operating environment for components of the modules. In the preferred embodiment, the cover 111 forms a metallic enclosure around the enclosed modules 106–108 when the cover 111 is attached, via screws, to the chassis 101. The metallic enclosure electromagnetically shields the enclosed modules from the other circuit and power elements in the power distribution assembly 100.

The chassis 101 preferably comprises cold rolled steel. The mounting patterns may be fabricated into the chassis 101.

In general, the present invention provides a power distribution assembly that amplifies received RF signals and splits the amplified RF signals into multiple equal amplitude signals, that provides DC power for the operation of components and devices internal and external to the power distribution assembly, and that monitors the performance of components, modules and devices internal and external to the power distribution assembly. In the preferred embodiment, the present invention comprises two 80 watt multi-output DC power supplies, power distribution assembly diagnostic circuitry, an interconnect module, a centerplane board, six signal splitter modules (three four-way signal splitter modules and three six-way signal splitter modules), and RF amplifiers for all six signal splitters, all within a volume of at most 0.009 cubic meters. With this invention, a substantially reduced volume, compared to prior art implementations, provides the maximum signal and power distribution and performance monitoring. The modular design of the invention and its diagnostic functionality allows for the detection and easy replacement of malfunctioning modules with minimal system downtime, thus improving system availability. The decreased volume of the present invention provides compatibility with current modular design approaches and facilitates a relatively compact power distribution assembly.

While the present invention has been particularly shown and described with reference to particular embodiments thereof, it will be understood by those skilled in the art that various changes in form and details may be made therein without departing from the spirit and scope of the present invention.

We claim:

1. A power distribution assembly comprising:
    at least three signal splitter modules, wherein each of the at east three signal splitter modules comprises at least one input connector and a plurality of output connectors;
    at least two direct current power supply modules;
    a centerplane board coupled to the at least three signal splitter modules and to the at least two direct current power supply modules, wherein the centerplane board provides a plurality of electrical paths among a plurality of modules contained in the power distribution assembly;
    a chassis that comprises mounting patterns for the at least three signal splitter modules, the at least two direct current power supply modules, and the at least one centerplane board; and
    wherein the at least three signal splitters modules, the at least two direct current power supply modules, and the at least one centerplane board are all mounted in the chassis and, along with the chassis, are all contained within an overall volume of at most 0.009 cubic meters.

2. The power distribution assembly of claim 1, wherein each of the at least three signal splitter modules and the at least two direct current power supply modules comprises a blindmate interface to the at least one centerplane board.

3. The power distribution assembly of claim 1, wherein each of the at least three signal splitter modules comprises at least one power element.

4. The power distribution assembly of claim 3, wherein the at least one power element comprises at least one amplifier circuit deposited on a printed circuit board.

5. The power distribution assembly of claim 1, wherein each of the at least three signal splitter modules further comprises a cover and a heat sink base.

6. The power distribution assembly of claim 5, wherein the heat ink base has a power dissipation of at least 3 watts per 0.0003 cubic meters.

7. The power distribution assembly of claim 1, wherein the chassis further comprises guides for the proper positioning of each of the at least three splitter modules in the power distribution assembly and wherein each splitter module of the at least three splitter modules further comprises guides that align with the guides of the chassis.

8. The power distribution assembly of claim 7, wherein each splitter module of the at least three splitter modules further comprises a cutout to facilitate the coupling of the at least one input connector of the splitter module to an external device.

9. The power distribution assembly of claim 1, further comprising an interconnect module that is coupled to the centerplane board and mounted in the chassis, wherein the interconnect module provides a plurality of electrical paths between one or more circuits within the power distribution assembly and devices external to the power distribution assembly, and wherein the chassis further comprises mounting patterns for the at least one interconnect module.

10. The power distribution assembly of claim 9, wherein the interconnect module further comprises connectors providing at least 64 interconnections.

11. The power distribution assembly of claim 1, further comprising at least one power distribution assembly diagnostic module that is coupled to the centerplane board and mounted in the chassis, which module comprises power distribution assembly diagnostic circuitry, and wherein the chassis further comprises mounting patterns for the least one power distribution assembly diagnostic module.

12. The power distribution assembly of claim 1, wherein the at least three signal splitter modules are coupled to the at least two direct current power supply modules via the centerplane board without the provision of any cabling.

13. The power distribution assembly of claim 1, wherein the at least three signal splitter modules comprises a first signal splitter module, a second signal splitter module, and a third signal splitter module, wherein the first signal splitter module, the second signal splitter module, and the third signal splitter module are co-planar in position, and wherein all of the output connectors of the first signal splitter module, the second signal splitter module, and the third signal splitter module are co-planar in position.

14. The power distribution assembly of claim 1, wherein the at least three signal splitter modules comprises a first signal splitter module, a second signal splitter module, a third signal splitter module, a fourth signal splitter module, a fifth signal splitter module, and a sixth signal splitter module.

15. The power distribution assembly of claim 14, wherein the first signal splitter module, the second signal splitter module, and the third signal splitter module are co-planar in position, wherein the fourth signal splitter module, the fifth signal splitter module, and the sixth signal splitter module are co-planar in position, and wherein the plane comprising the first signal splitter module, the second signal splitter module, and the third signal splitter module is different from and parallel to the plane comprising the fourth signal splitter module, the fifth signal splitter module, and the sixth signal splitter module, wherein all of the output connectors of the first signal splitter module, the second signal splitter module, and the third signal splitter module are co-planar in position and wherein all of the output connectors of the fourth signal splitter module, the fifth signal splitter module, and the sixth signal splitter module are co-planar in position.

16. A power distribution assembly comprising:

at least two signal splitter modules, wherein each of the at least two signal splitter modules comprises at least one input connector and a plurality of output connectors;

at least two direct current power supply modules;

an interconnect module providing a plurality of electrical paths between one or more circuits within the power distribution assembly and devices external to the power distribution assembly;

a centerplane board coupled to the at least two signal splitter modules, the at least two direct current power supply modules, and the interconnect module, wherein the centerplane board provides a plurality of electrical paths among a plurality of modules contained in the power distribution assembly;

a chassis that comprises mounting patterns for the at least two signal splitter modules, the at least two direct current power supply modules, the at least one interconnect module, and the at least one centerplane board; and wherein the at least two signal splitters modules, the at least two direct current power supply modules, the interconnect module, and the centerplane board are all mounted in the chassis and, along with the chassis, are all contained within an overall volume of at most 0.009 cubic meters.

17. The power distribution assembly of claim 16, wherein each of the at least two signal splitter modules comprises at least one power element.

18. A power distribution assembly comprising:

at least three power amplifier modules, wherein each of the at least three power amplifier modules comprises a direct current distribution circuit, a signal splitter circuit, and at least one power element;

at least two direct current power supplies;

a printed circuit board coupled to the at least three power amplifier modules and the at least two direct current power supplies, wherein the printed circuit board provides a plurality of electrical paths among a plurality of modules contained in the power distribution assembly;

a chassis that comprises mounting patterns for the at least three power amplifier modules, the at least two direct current power supplies, and the at least one printed circuit board; and wherein the at least three power amplifier modules, the at least two direct current power supplies, and the printed circuit board are all mounted in the chassis and, along with the chassis, are all contained within an overall volume of at most 0.009 cubic meters.

19. The power distribution assembly of claim 18, wherein the at least one power element comprises at least one amplifier circuit deposited on a printed circuit board.

* * * * *

UNITED STATES PATENT AND TRADEMARK OFFICE
CERTIFICATE OF CORRECTION

PATENT NO. : 6,069,797
DATED : May 30, 2000
INVENTOR(S) : Widmayer et al.

It is certified that error appears in the above-identified patent and that said Letters Patent is hereby corrected as shown below:

Column 8, line 11 reads "east" should be -- least --.

Column 8, line 44 reads "ink" should be -- sink --

Signed and Sealed this

Twenty-seventh Day of March, 2001

Attest:

NICHOLAS P. GODICI

Attesting Officer        Acting Director of the United States Patent and Trademark Office